United States Patent [19]

Peterson

[11] 4,187,894
[45] Feb. 12, 1980

[54] TIRE TRACTION DEVICE

[76] Inventor: Ted S. Peterson, 1908 SE. 16th Pl., Renton, Wash. 98055

[21] Appl. No.: 883,702

[22] Filed: Mar. 6, 1978

[51] Int. Cl.² .......................................... B60C 27/02
[52] U.S. Cl. .................................................. 152/222
[58] Field of Search ............... 152/222, 224, 226, 239, 152/241

[56] References Cited

U.S. PATENT DOCUMENTS

| | | | |
|---|---|---|---|
| 720,201 | 2/1903 | White | 24/176 |
| 812,862 | 2/1906 | Merrill et al. | 24/176 |
| 993,222 | 5/1911 | Busby | 152/222 |
| 1,201,959 | 10/1916 | Havisch | 24/176 |
| 1,864,938 | 6/1932 | Respess | 152/222 |
| 1,943,918 | 1/1934 | Kine | 152/222 |
| 2,632,491 | 3/1953 | Eisner | 152/222 |
| 2,672,910 | 3/1954 | Corson | 152/211 |
| 3,049,778 | 8/1962 | Weckesser | 24/180 |
| 3,683,990 | 8/1972 | Detwiler | 152/225 |
| 3,817,307 | 6/1974 | Detwiler | 152/226 |

Primary Examiner—Richard A. Bertsch

[57] ABSTRACT

A plastic tire chain apparatus especially adapted to permit replacement or redistribution of traction members without the need of specialized skills or tools. The tire chain apparatus comprises a plurality of plastic or rubber traction cross members, adapted to engage the tire perpendicular to the circumferential axis of the tire along the tread surface, with each cross member having an outer surface adapted to engage the road and an inner surface adapted to engage the tire tread. Each cross member has a pair of connecting members, one on either end thereof. Each connecting member is comprised of a first connecting portion having four spaced slots aligned generally parallel with the lengthwise axis of the cross member and a locking portion having a pair of parallel locking slots spaced from one another so as to be offset from the inner pair of slots of the first connecting portion. The first and second portions of the connecting member are positioned against one another so that a strap threaded therethrough will be placed in wedging engagement between the first connecting portion and the second locking portion when tension is applied to the strap.

3 Claims, 6 Drawing Figures

TIRE TRACTION DEVICE

BACKGROUND OF THE INVENTION

1. Field of the Invention

The present invention relates to tire traction devices, such as plastic tire chains used to increase the traction of automobile tires in snow or ice.

2. Description of the Prior Art

Tire chains have long been used to increase the traction of vehicles which must be driven in conditions of ice, snow or mud, with the conventional tire chain arrangement being a series of equally spaced cross links connected on their ends by a circular length of chain or webbing. The earlier tire chains which are still utilized today are made of metal, such as steel, and are in the form of a conventional link chain. There are a number of inherent undesirable characteristics in metal tire chains, such as bulkiness, a tendency to rust when stored, difficulty of installation, a tendency to wear out quickly when used on bare pavement, difficulty in repairing broken or damaged cross links, and unpleasant noise levels during use. Additionally, conventional metal tire chains may severely damage the sidewalls of radial tires, which are becoming an increasingly large percentage of the retail passenger car tire market. For these and other reasons, in recent years tire chains have been manufactured of rubber, plastic, or other flexible materials in an attempt to alleviate the aforementioned problems inherent with metal tire chains.

Even though the plastic or rubber tire chains are less subject to damage and breakage than metal tire chains which would necessitate either replacement of the entire assembly, or of an individual cross link in an assembly, there still is the possibility that a cross member will need to be replaced. The current plastic or rubber tire chain cross links known to the applicants herein are either very difficult to replace, requiring a special repair kit and some degree of mechanical ability, or impossible to replace due to their integral construction. Even if a particular tire chain cross member may be replaceable, in the event that a replacement part is not readily available, there is no provision made for spacing apart the remaining cross members until a replacement is available, due to their fixed character in the total assembly.

One type of prior art plastic tire chain is shown in U.S. Pat. No. 3,817,307, in which transverse strap elements are equally spaced around the circumference of an automobile tire, and are anchored on their ends by a length of steel cable. When the tire skids on soft surfaces such as snow or mud, frictional and mechanical engagement between each strap and the road will cause the strap to automatically deform and twist, thereby bringing a portion of the undersurface of the strap into contact with the snow or mud and assist in stopping the slippage. A number of embodiments are shown in strap element configurations, as well as methods of anchoring to the anchor strap or cable.

U.S. Pat. No. 3,683,990, reveals a tire and a non-skid assembly, with the assembly mounted in transverse grooves provided in the outer circumferential surface of the tire. The assembly will be displaced from the grooves when the tire skids on the road surface and will frictionally engage the road surface and assist in stopping the skid. When the tire returns to normal engagement with the road surface the assembly will automatically return to its normal configuration in the grooves.

U. S. Pat. No. 2,632,491, discloses another plastice or rubber tire chain and comprises a plurality of cross members provided with sintered carbide rivet-like members for extra traction. The cross members are attached together by chain links arranged around each side of the tire.

U. S. Pat. No. 3,092,163, discloses another elastomeric traction device, wherein there are a plurality of cross links interlocked to provide an annular-like shape around the tire. Each cross member has between two and four transverse cross link bands interlocked by peripheral side loops. Each cross member has a tread section consisting of at least two cross bands with a plurality of interconnecting members forming "X" or theta-shaped patterns. Each of the cross links is integrally joined at the ends thereof by elastomeric spring-acting side members, with each cross link having male and female side members which fit the mating side members of the adjacent cross links.

U.S Pat. No. 1,943,918, discloses yet another plastic tire chain configuration wherein the cross straps are of conventional shape and design and connected at their end with permanent or detachable connecting members in the nature of chain links or double folded wire with hooks on each end thereof.

U.S. Pat. No. 1,864,938, illustrates yet another type of flexible tire chain, wherein the cross links are attached to a side chain by means of a double wire hook member, which allows each cross link to be individually removed from the assembly.

While not directly related to vehicle tire traction devices, a number of patents noted in a prior art search disclose various locking devices. U.S. Pat. No. 3,049,778, illustrates a rachet buckle which is used in conjunction with a perforated strap. The buckle has a longitudinal passage therethrough, with a recessed base having a rachet pin thereon. The ratchet pin intersects the passage and has a tapered top surface which acts as a cam surface exposed to one end of the passage. The perforated strap is inserted into the passage at one end of the buckle to a desired distance and the rachet pin inserted through the perforation. The end of the strap is passed out the opposite end of the buckle, a loop is formed and the strap is then reversely threaded through the buckle from the opposite end. The rachet pin is again inserted through the strap to form a means for securing a compact bundle, such as of pipes.

U.S. Pat. No. 1,201,959, illustrates another buckle arrangement wherein a base plate and pin are surrounded by a raised frame with side plates connecting the base and frame. Side loops are provided for the attachment of straps at right angles to the main strap passing through the buckle. The operation of the buckle is much the same as that in the previously described patent.

Another buckle configuration is disclosed in U.S. Pat. No. 812,862, where there are semi-circular members, one of which has an integral crossbar with a pin projecting laterally therefrom. The crossbar is slightly below the plane of the semi-circular members and the free end of the crossbar constitutes a pivot point for mounting in the center of the second semi-circular member. One end of a strap is permanently connected to the crossbar, and upon pivoting the second member on the crossbar a main perforated strap portion may be inserted and the pin inserted through the appropriate perforation in order to form a buckle apparatus for a team of horses hitched together.

U.S. Pat. No. 720,201 illustrates yet another buckle arrangement used to shield harness buckles so that extraneous projections will not be caught in the harness. A short length of shield-strap is secured to the main harness strap with a rivet or stitching, and the free end of the shield-strap is run through a conventional buckle which holds the harness line together.

SUMMARY OF THE INVENTION

In the present invention, there is a traction device for a tire having a circumferential axis and tread surface, with the traction device being adapted to engage the tire along the tread surface. There are a plurality of cross members, each having a lengthwise axis adapted to engage the tread surface, with the lengthwise axis generally perpendicular to the tread pattern and the circumferential axis of the tire. Each cross member has an outer surface adapted to engage the road surface and an inner surface adapted to engage the tread surface. A pair of elongate straps are adapted to be positioned on opposite sides of the tread surface so as to extend circumferentially around the side of each tire, with the straps positioning the cross members at spaced intervals along the circumferential axis of the tire. There are also a plurality of pairs of connecting members, each pair of connecting members being located on opposite ends of a related cross member. Each connecting member comprises a first connecting portion having a plurality of slots and a second locking portion adapted to interact with the first connecting portion and engage the related strap at selected locations so as to lock the strap to the connecting members.

The locking portion of each connecting member is a tension responsive locking member which may be released from its locking position by relieving the tension on its related strap. Conversely, the locking member can be caused to be in its locking position by placing tension on the strap. The first connecting portion of each connecting member has a pair of through slots adapted to receive the related strap, and the second locking portion also has slots adapted to receive the same strap. The slots of the second locking portion are offset from the slots of its related first connecting portion so as to place the strap threaded therethrough in wedging engagement between the first connecting portion and the second locking portion when tension is placed on the strap.

In the preferred form, the first connecting portion of each connecting member is provided with four spaced slots aligned generally parallel with the lengthwise axis of the cross member, the four slots being made up of an inner pair of slots and an outer pair of slots. The locking portion has a pair of parallel locking slots spaced from one another so as to be in offset relationship with the inner pair of slots of the first connecting member. The first and second portions of the connecting member are positioned against one another so that the straps can be threaded through a first slot of the outer pair of slots on the first connecting member, then alternately through the inner pair of slots and the pair of locking slots, and finally out through the other slot of the outer pair of slots on the first connecting member. When tension is applied on the strap, the second locking portion is pulled by the strap against the first connecting portion, whereby the pair of slots on the locking portion wedges the strap against the inner pair of slots on the first connecting portion.

Other features of the invention will become apparent from the following detailed description.

DESCRIPTION OF THE PREFERRED EMBODIMENT

Figure 1:
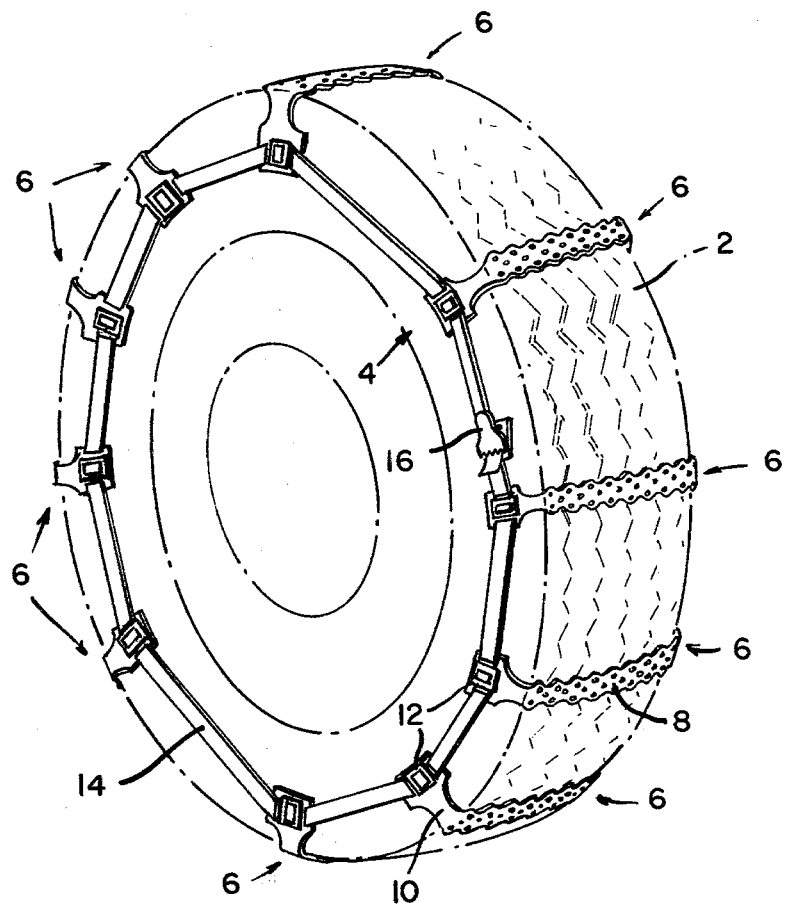
FIG. 1 is an isometric view illustrating the arrangement of the plastic tire chain assembly in place around an automobile tire.

As illustrated in FIG. 1, there is an automobile drive tire 2 in an upright position as it would appear when mounted on an automobile. When used in conditions of deep snow, ice or mud, such tires are commonly equipped with traction devices, such as plastic tire chains which increase the traction and braking ability of ordinary tires. The plastic tire chain 4 of the present invention comprises a plurality of transverse mounted cross links 6 each having a traction portion 8 and side wall portions 10 on either end of the traction portion 8. Tension connecting members 12 affix the side wall portion 10 to a pair of positioning straps 14 which extend circumferentially on opposite sides of the tire 2 to connect all of the traction portions 8 to one another and maintain them in proper alignment on the automobile tire 2. While only one strap 14 is shown in FIG. 1, it is to be understood the second strap 14 is positioned on the opposite side of the tire. A pair of buckles 16 of conventional design is provided to tighten the two positioning straps 14 and hold the cross links 6 securely against the tire 2.

Figure 2:
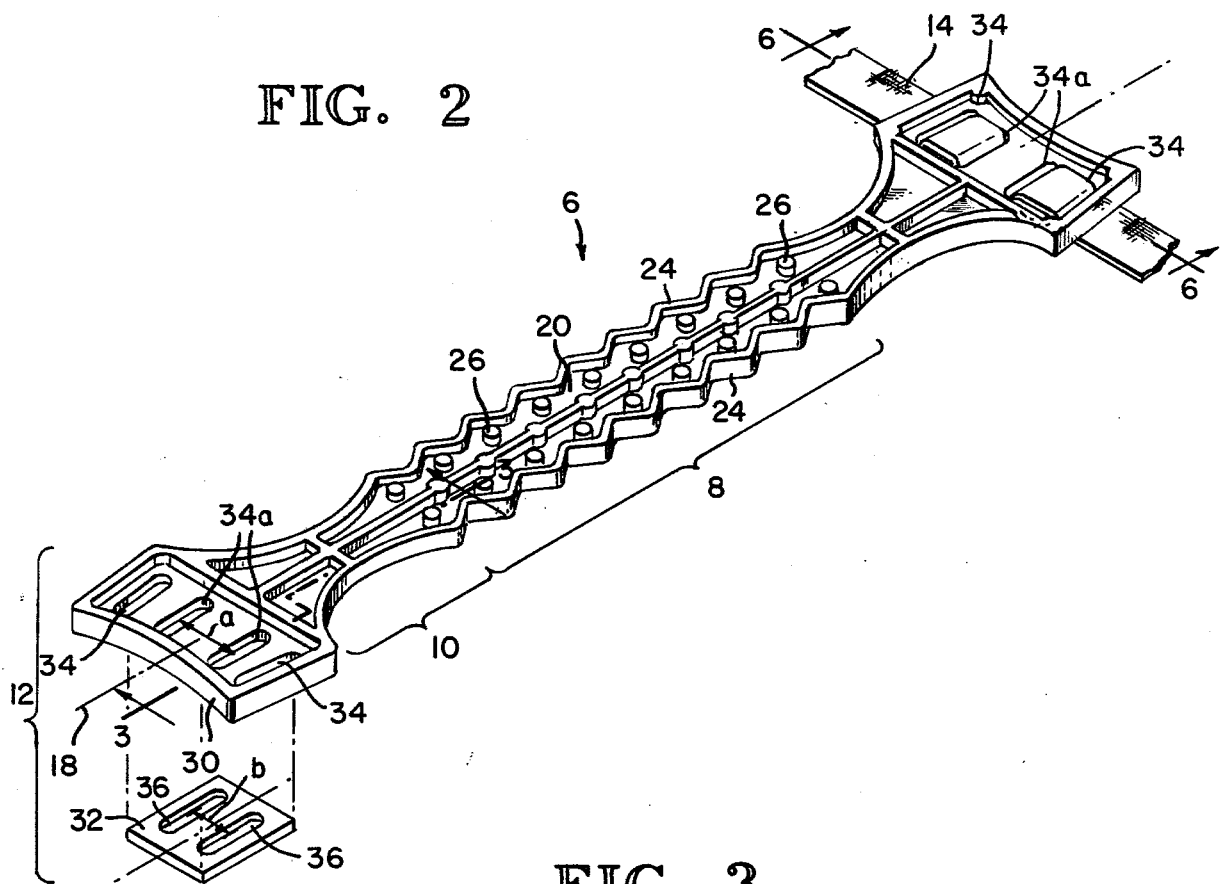
FIG. 2 is an isometric view illustrating a cross member of the present invention with its associated connecting member and strap.
Figure 3:
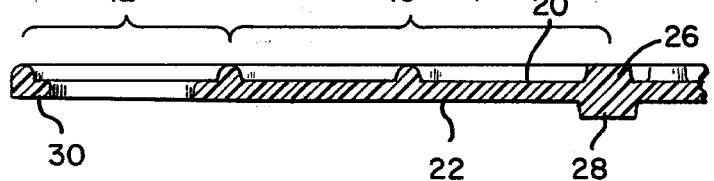
FIG. 3 is a sectional view taken along line 3—3 of FIG. 2.
Figure 5:
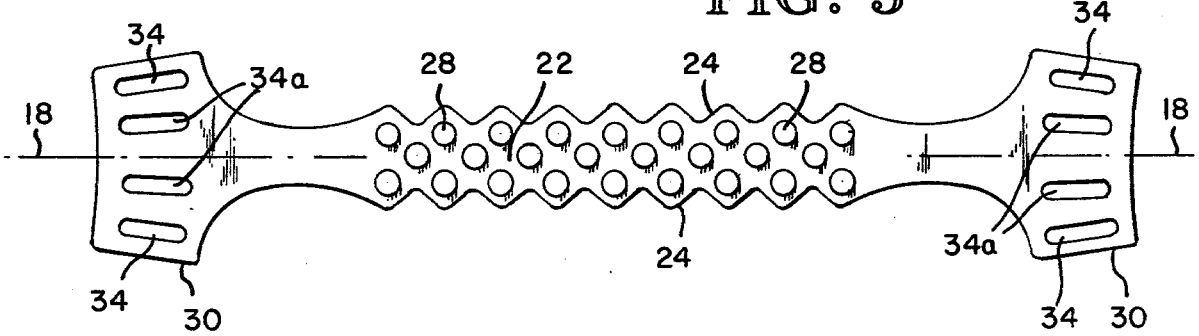
FIG. 5 is a bottom isometric view of a cross member of the present invention.

Each of the cross links 6, which are aligned transverse to the direction of tread on the tire surface, as shown in FIG. 2, has a lengthwise axis 18 with the traction portion 8 centered thereon, an outwardly facing side 20 which contacts the road surface, and an inwardly facing side 22 which faces the tire to which it is attached. The traction portion 8 has leading edges 24 on both of its lengthwise sides, said edges acting to increase traction by biting into snow or ice. Also provided are protruberances 26 on the outwardly facing side 20 to enhance the traction characteristics of the tire chains 4. So that the cross links 6 will be relatively immovable while affixed to the automobile tire 2, there are short blunt fingers 28 on the inwardly facing side of the cross link 6 which press into the rubber tread of the tire and inhibit the tire 2 from rotating relative to the inwardly facing side 22 of the cross link 6 when the cross link 6 is between the tire 2 and the roadbed as the drive wheel is attempting to accelerate.

The side wall portion 10 of the cross link 6 is merely an extension of the traction portion 8 which may be flexed at an angle to the traction portion 8 so that the cross link 6 may conform to the side wall of the tire 2.

Of particular significance in the present invention is the manner in which it permits an easy and effective means of replacing and/or redistributing cross links 6 in the event of one becoming damaged. There are two tension connecting members 12 located at opposing ends of each of the cross links 6. Each member 12 consists of a first member 30 formed integrally with the cross link 6 as an extension of the side wall portion 10, and a second member 32 provided separate and apart from the remainder of the cross link 6. The first member 30 is a rectangularly-shaped planar member constructed in the same plane as the remainder of the cross link 6 but with a width substantially greater than that of the cross link 6.

Figure 4:
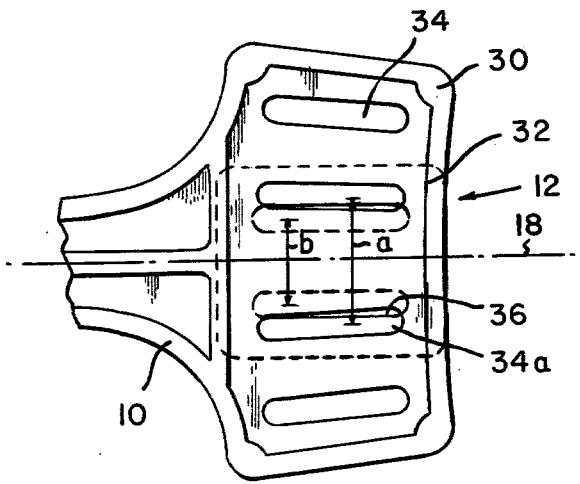
FIG. 4 is an isometric view of a connecting member attached to the cross member of the present invention.

The member 30 is formed with four receiving slots 34, and the member 32 is formed with two locking slots 36. The slots 34 and 36 are of the same approximate size, with those of the first member 30 being aligned generally parallel to the lengthwise axis 18 of the cross link 6. The adjacent medial receiving slots 34a of the member 30 are equidistant from the center lengthwise axis 18 through the first member 30. The distance designated in FIG. 2 by the letter "a", between the centers of the medial adjacent receiving slots 34a is moderately greater than that distance between the centers of the two locking slots 36 of the second member, this distance being designated by the letter "b". Thus, when the second member 32 is placed directly over the first member 30 with the slots 34 and 36 aligned parallel to the lengthwise axis 18 as shown in FIG. 4, the adjacent medial receiving slots 34a of the first member 30 are spaced a short distance outwardly of the locking slots 36 of the second member 32.

In order to initially assemble the tire chains 4, one needs no tools or specialized skills. With the second member 32 positioned and centered above the first member 30 and with the slots 34 and 36 aligned parallel with one another, the strap 14 is threaded through the members 30 and 32 so as to position the cross links 6 in the desired position, relative to each other and to the tire 2, and to hold them in that position during use. As shown in FIG. 2, the strap 14 is threaded through an outer receiving slot 34 of the first member 30 from the outwardly facing side 20 and then back through the first member 30 from the inwardly facing side 22 through one of the adjacent medial receiving slots 34a. After pulling the strap 14 through the outwardly facing side 20 of the first member 30, it is threaded through one slot 36 of the second member 32 from the inwardly to the outwardly facing side thereof. The strap 14 is then threaded through the other of the slots 36 from the outward to the inward side and down through the other adjacent medial receiving slot 34a of the second member 30. The strap 14 is then brought through the final receiving slot 34b from the inwardly facing side 22 to the outwardly facing side 20.

Once the cross links 6 are already threaded on the strap 14, in order to adjust the position of the cross links 6 on the strap 14, it is necessary only to thread the strap 14 through the slots 34 and 36. By moving the strap 14 downwardly through either end receiving slot 34 of the first member 30 and then pulling it up through the medial receiving slot 34a and the slot 36 of the second member 32, the cross link 6 may be moved a distance along the strap 14 in the direction from which the strap 14 was pulled equal to the amount of strap 14 initially pulled through the first member 30. The strap 14 is then pulled down through the adjacent slot 36 of the second member 32 and the other medial receiving slot 34a, and finally out the final first member 30 end receiving slot 34.

Due to its adjustable nature, the present invention may be utilized on any size automobile tire, with the only necessary addition being additional cross links 6 for a tire of greater diameter. The tire chain assembly 4 may be provided in retail outlets in either the assembled or unassembled condition, since it may be easily assembled with the directions provided therewith. If provided in the unassembled condition, in order to adjust the assembly 4 to the particular size tire upon which it will be used, the user may fit the assembly to the spare tire (assuming it to be the same size as the tire upon which the tire chain 4 will be used) in the comfort of his garage or home. If provided in an unassembled condition, or for some reason an assembled assembly results in the cross links 6 having an unequal spatial distribution around the tire 2, the cross links will be threaded onto, or moved along, the strap 14.

If for some reason a cross link 6 were to become damaged or broken, so as to possibly cause either damage to the wheel well or an undesirable noise due to its making contact with the wheel well, tire, or other structure, it may be deemed desirable to remove it, wherein there are two methods of removing a cross link 6 and still maintaining an equal spatial distribution between the remaining cross links 6. If the user did not have a replacement cross link available when it was needed, all he must do is simply remove the broken or damaged cross link 6, such as by cutting with a knife, leaving the side wall portions attached to the strap 14, then loosen the tension of the strap 14 and move the cross links 6 a few inches each to position them in an equally spaced arrangement.

If a replacement cross link 6 is immediately available, all one must do is remove the damaged cross link, loosen the tension on the strap 14, and slide the adjacent cross link 6 (as described above) into the position previously occupied by the broken cross link. Thereafter each succeeding cross link 6 is moved into the position vacated by the peceding cross link 6, until a cross link 6 may be added to the assembly in the position of the end cross link 6. In this manner the original cross link configuration is preserved without the necessity of specialized skills or tools.

Figure 6:
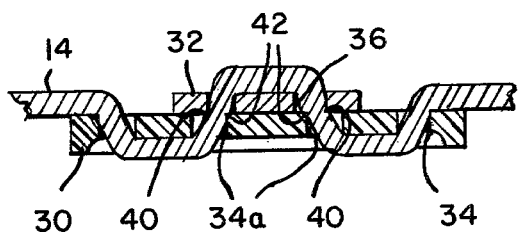
FIG. 6 is a sectional view taken along line 6—6 of FIG. 2.

In order to tighten the cross links 6 in place upon the strap 14 so as to maintain the desired configuration of cross links, by pulling the strap 14 tight from either or both sides of the cross link 6, the second member 32 will lock the strap 14 in place against the first member 30. As illustrated in FIG. 6, this locking results from the locking slots 36 of the second member 32 being closer together than the adjacent medial receiving slots 34a of the first member 30 immediately thereunder. Therefore, as the strap 14 pulls the second member 32 down toward the first member 30, the edges 40 of the second member 32 crimp the strap 14 against the edges 42 of the adjacent medial receiving slots 34a of the first member 30. Any tension on either end of the strap 14 will cause the second member to crimp the strap 14 against the first member 30 and therefore prevent the cross link 6 from moving along the strap 6.

What is claimed:

1. A traction device for a tire, said tire having a tread surface and a circumferential axis extending around and along said tread surface, said traction device being adapted to engage said tire along said circumferential axis, said traction device comprising:
- a. a plurality of cross members, each having a lengthwise axis and adapted to engage said tread surface with its lengthwise axis generally perpendicular to said circumferential axis, each cross member having an outer surface adapted to engage a road surface and an inner surface adapted to engage said tread surface,
- b. a pair of elongate straps adapted to be positioned on opposite sides of the tread surface so as to extend circumferentially around side portions of said tire, with said straps positioning said cross members at spaced locations along said circumferential axis,
- c. a plurality of pairs of connecting members, each pair of connecting members being located on opposite ends of a related cross member, each connecting member having a first connecting portion defining slot means to receive a related strap in threaded through relationship, and a second locking portion adapted to engage its related strap at selected locations there-along so as to lock that strap to said connecting members at such selected locations,
- d. the first connecting portion of the connecting member being provided with a first pair of spaced slots, and its related second locking portion being provided with a second pair of locking slots spaced in offset relationship with respect to the first pair of slots, whereby with a related strap threaded through both pairs of slots, when tension is applied to said strap, said first and second portions of the connecting member press that strap in locking wedging engagement with the connecting member, whereby said cross members may be moved to selected locations along said straps to first desired locations along said tire and locked in place, and said cross members can be moved to second desired locations and again locked in place at said second locations, so that tires of different sizes can be fitted with said traction device, and so that in the event one cross member is broken and removed from said straps, the remaining cross members can be repositioned along the circumferential axis of said tire in proper location.

2. A traction device for a tire, said tire having a tread surface and a circumferential axis extending around and along said tread surface, said traction device being adapted to engage said tire along said circumferential axis, said traction device comprising:
- a. a plurality of cross members, each having a lengthwise axis and adapted to engage said tread surface with its lengthwise axis generally perpendicular ot said circumferential axis, each cross member having an outer surface adapted to engage a road surface and an inner surface adapted to engage said tread surface,
- b. a pair of elongate straps adapted to be positioned on opposite sides of the tread surface so as to extend circumferentially around side portions of said tire, with said straps positioning said cross members at spaced locations along said circumferential axis,
- c. a plurality of pairs of connecting members, each pair of connecting members being located on opposite ends of a related cross member, each connecting member having a first connecting portion defining slot means to receive a related strap in threaded through relationship, and a second locking portion adapted to engage its related strap at selected locations there-along so as to lock that strap to said connecting members at such selected locations,
- d. the first connecting portion of each connecting member being provided with four spaced slots aligned generally parallel with the lengthwise axis of the cross member, said four slots being made up of an inner pair of slots and an outer pair of slots, said locking portion having a pair of parallel locking slots spaced from one another so as to be in offset relationship with said inner pair of slots of the first connecting portion, said first and second portions of the connecting member being positioned against one another in a manner that said strap can be threaded through a first slot of said outer pair of slots, thence through the inner pair of slots and the pair of locking slots, and then through the other slot of the outer pair of the slots, whereby when tension is applied on said strap, said second locking portion is pulled by said strap against said first connecting portion, with the pair of slots on the locking portion placing the strap in wedging engagement with the inner pair of slots of the first connecting portion, whereby said cross members may be moved to selected locations along said straps to first desired locations along said tire and locked in place, and said cross members can be moved to second desired locations and again locked in place at said second locations, so that tires of different sizes can be fitted with said traction device, and so that in the event one cross member is broken and removed from said straps, the remaining cross members can be repositioned along the circumferential axis of said tire in proper location.

3. A traction device for a tire, said tire having a tread surface and a circumferential axis extending around and along said tread surface, said traction device being adapted to engage said tire along said circumferential axis, said traction device comprising:
- a. a plurality of cross members, each having a lengthwise axis and adapted to engage said tread surface with its lengthwise axis generally perpendicular to said circumferential axis, each cross member having an outer surface adapted to engage a road surface and an inner surface adapted to engage said tread surface,
- b. a pair of elongate straps adapted to be positioned on opposite sides of the tread surface so as to extend circumferentially around side portions of said tire, with said straps positioning said cross members at spaced locations along said circumferential axis,
- c. a plurality of pairs of connecting members, each pair of connecting members being located on opposite ends of a related cross member, each connecting member having a first connecting portion defining slot means to receive a related strap in threaded through relationship, and a second locking portion adapted to engage its related strap at selected locations there-along so as to lock that strap to said connecting members at such selected locations,
- d. said locking portion of each connecting member being a tension responsive locking member, whereby said locking member can be released from its locking position by relieving tension on its related strap, and said locking member can be caused to be in its locking position by placing tension on said strap, e. the first connecting portion of each connecting member having a pair of through slots adapted to receive its related related strap, and said second locking portion has slot means with at least one locking slot adapted to receive said related strap, with said locking slot offset from the pair of slots of its related first connecting portion so as to place its related strap in wedging engagement between said first connecting portion and said second locking portion when tension is applied on said strap, whereby said cross members may be moved to selected locations along said straps to first desired locations along said tire and locked in place, and said cross members can be moved to second desired locations and again locked place at said second locations, so that tires of different sizes can be fitted with said traction device, and so that in the event one cross member is broken and removed from said straps, the remaining cross members can be repositioned along the circumferential axis of said tire in proper location.

* * * * *